US011611811B2

(12) United States Patent
Zhang et al.

(10) Patent No.: US 11,611,811 B2
(45) Date of Patent: Mar. 21, 2023

(54) VIDEO PROCESSING METHOD AND DEVICE, UNMANNED AERIAL VEHICLE AND SYSTEM

(71) Applicant: SZ DJI TECHNOLOGY CO., LTD., Shenzhen (CN)

(72) Inventors: Wei Zhang, Shenzhen (CN); Ang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/827,190

(22) Filed: Mar. 23, 2020

(65) Prior Publication Data

US 2020/0366840 A1 Nov. 19, 2020

Related U.S. Application Data

(63) Continuation of application No. PCT/CN2017/104389, filed on Sep. 29, 2017.

(51) Int. Cl.
*H04N 5/232* (2006.01)
*H04N 7/18* (2006.01)
(Continued)

(52) U.S. Cl.
CPC ........... *H04N 23/698* (2023.01); *H04N 7/188* (2013.01); *H04N 23/695* (2023.01)

(58) Field of Classification Search
CPC ........... H04N 5/23209; H04N 5/23238; H04N 5/23299; H04N 7/185; H04N 7/188; G05D 1/101
See application file for complete search history.

(56) References Cited

U.S. PATENT DOCUMENTS 5,694,530 A * 12/1997 Goto ..................... G06T 11/006
345/419
9,485,427 B2 11/2016 Wang et al.
(Continued)

FOREIGN PATENT DOCUMENTS

CN 102201115 A 9/2011
CN 102495522 A 6/2012
(Continued)

OTHER PUBLICATIONS

The World Intellectual Property Organization (WIPO) International Search Report for PCT/CN2017/104389 dated Jul. 4, 2018 7 pages.
(Continued)

*Primary Examiner* — Peet Dhillon
(74) *Attorney, Agent, or Firm* — Anova Law Group, PLLC

(57) ABSTRACT

The present disclosure provides a video processing method, applied to an unmanned aerial vehicle (UAV) equipped with a camera device for capturing videos. The video processing method includes in response to the UAV moving in accordance with a flight trajectory, controlling the camera device of the UAV to obtain a first video segment when reaching a first photography point; in response to reaching a second photography point as the UAV continues moving, controlling the camera device of the UAV to capture environmental images to obtain a panoramic image, and generating a second video segment based on the panoramic image; and generating a target video based on the first video segment and the second video segment.

20 Claims, 7 Drawing Sheets

(51) Int. Cl.
*H04N 23/698* (2023.01)
*H04N 23/695* (2023.01)

(56) References Cited

U.S. PATENT DOCUMENTS

| | | | | |
|---|---|---|---|---|
| 9,758,246 | B1* | 9/2017 | Lema | B64C 39/024 |
| 9,836,054 | B1* | 12/2017 | Lema | H04N 21/251 |
| 2011/0164108 | A1 | 7/2011 | Bates et al. | |
| 2013/0176423 | A1* | 7/2013 | Rischmuller | A63H 27/12 |
| | | | | 348/114 |
| 2015/0042647 | A1* | 2/2015 | Shohara | G06T 15/205 |
| | | | | 345/420 |
| 2015/0350614 | A1* | 12/2015 | Meier | H04N 7/188 |
| | | | | 348/144 |
| 2016/0191795 | A1* | 6/2016 | Han | G06T 3/4038 |
| | | | | 348/36 |
| 2016/0198088 | A1* | 7/2016 | Wang | H04N 5/23238 |
| | | | | 348/36 |
| 2016/0266579 | A1* | 9/2016 | Chen | G06V 20/176 |
| 2016/0309087 | A1* | 10/2016 | Jayaram | G11B 27/005 |
| 2017/0169854 | A1* | 6/2017 | Chen | H04N 21/812 |
| 2018/0136650 | A1* | 5/2018 | Tian | G06V 10/147 |

FOREIGN PATENT DOCUMENTS

| | | |
|---|---|---|
| CN | 103679674 A | 3/2014 |
| CN | 104035446 A | 9/2014 |
| CN | 104808680 A | 7/2015 |
| CN | 105045279 A | 11/2015 |
| CN | 105203084 A | 12/2015 |
| CN | 105511488 A | 4/2016 |
| CN | 105847682 A | 8/2016 |
| CN | 106027896 A | 10/2016 |
| CN | 106029501 A | 10/2016 |
| CN | 106231191 A | 12/2016 |
| CN | 106464811 A | 2/2017 |
| CN | 205921694 U | 2/2017 |
| CN | 106603970 A | 4/2017 |
| CN | 106708087 A | 5/2017 |
| CN | 106998451 A | 8/2017 |
| CN | 107085436 A | 8/2017 |
| CN | 107123090 A | 9/2017 |
| EP | 2353999 A1 | 8/2011 |
| JP | 2016219941 A | 12/2016 |
| KR | 101989973 B1 * | 9/2019 |
| RO | 130188 | 4/2015 |
| WO | 2010143179 A1 | 12/2010 |
| WO | WO-2016161426 A1 * | 10/2016 ........... B64C 39/024 |

OTHER PUBLICATIONS

The World Intellectual Property Organization (WIPO) International Search Report for PCT/CN2018/088723 dated Aug. 23, 2018 5 pages.

Xiao-xiao Huang et al., "A Trajectory Planning Method Based on Air-ground Cooperation," Journal of Highway and Transportation Research and Development, pp. 134-145, Nov. 15, 2016.

* cited by examiner

VIDEO PROCESSING METHOD AND DEVICE, UNMANNED AERIAL VEHICLE AND SYSTEM

CROSS-REFERENCE TO RELATED APPLICATION

This application is a continuation of International Application No. PCT/CN2017/104389, filed on Sep. 29, 2017, the entire content of which is incorporated herein by reference.

TECHNICAL FIELD

The present disclosure generally relates to the field of control technology and, more particularly, relates to a video processing method and device, and an unmanned aerial vehicle and system.

BACKGROUND

With the development of computer technology and the increasing demands from users, aircrafts such as unmanned aerial vehicles (UAVs) have found more and more applications. A UAV capable of capturing images or videos mainly includes a gimbal, a camera device, and an airframe. Such a UAV is capable of capturing various environmental images or videos according to the needs of users. When the UAV is taking images or videos, the gimbal is usually mounted below or above the UAV. Through the rotation of the gimbal, the camera device disposed on the gimbal may be able to capture environmental images or videos at different angles with respect to the UAV.

However, video recording often requires professional photographic equipment and skilled person, and how to better control UAV for video recording has become a research interest.

SUMMARY

One aspect of the present disclosure provides a video processing method, applied to an unmanned aerial vehicle (UAV) equipped with a camera device for capturing videos. The video processing method includes in response to the UAV moving in accordance with a flight trajectory, controlling the camera device of the UAV to obtain a first video segment when reaching a first photography point; in response to reaching a second photography point as the UAV continues moving, controlling the camera device of the UAV to capture environmental images to obtain a panoramic image, and generating a second video segment based on the panoramic image; and generating a target video based on the first video segment and the second video segment.

Another aspect of the present disclosure provides a video processing device. The video processing device includes a memory and a processor. The memory is configured to store program instructions. The processor is configured to execute the program instructions stored in the memory to implement a video processing method applied to an unmanned aerial vehicle (UAV) equipped with a camera device for capturing videos, and the processor is configured to in response to the UAV moving in accordance with a flight trajectory, control the camera device of the UAV to obtain a first video segment when reaching a first photography point; in response to reaching a second photography point as the UAV continues moving, control the camera device of the UAV to capture environmental images to obtain a panoramic image, and generate a second video segment based on the panoramic image; and generate a target video based on the first video segment and the second video segment.

Other aspects of the present disclosure can be understood by those skilled in the art in light of the description, the claims, and the drawings of the present disclosure.

BRIEF DESCRIPTION OF THE DRAWINGS

In order to more clearly illustrate the technical solutions in the embodiments of the present disclosure, the drawings that need to be used in the description of the embodiments will be briefly described below. It is obvious that the drawings in the following description are some embodiments of the present disclosure, and for those of ordinary skill in the art, other drawings may also be obtained according to these drawings without any creative effort.

DETAILED DESCRIPTION OF THE EMBODIMENTS

Figure 1:
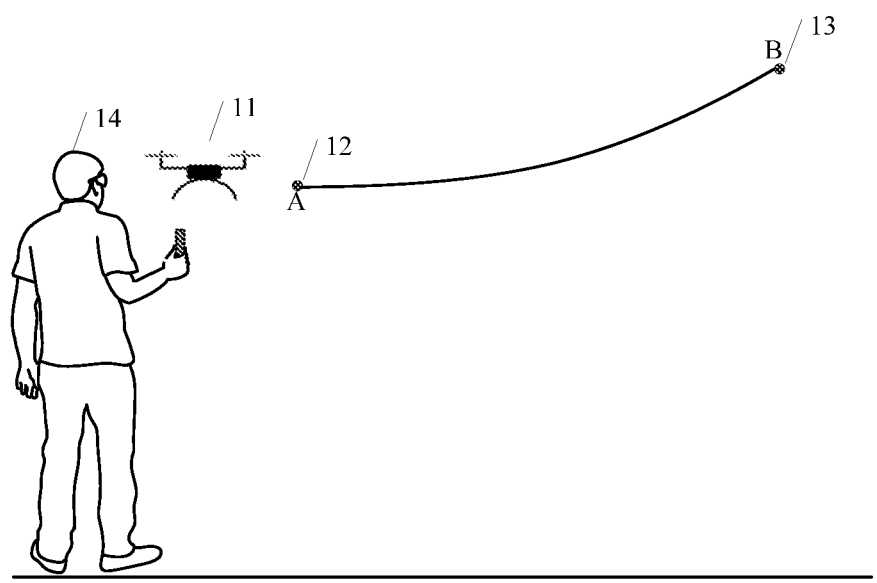
FIG. 1 illustrates a schematic diagram of an exemplary flight trajectory according to various embodiments of the present disclosure.

In the following, the technical solutions in the embodiments of the present disclosure will be clearly described with reference to the accompanying drawings in the embodiments of the present disclosure. It is obvious that the described embodiments are only a part of the embodiments of the present invention, but not all of the embodiments. All other embodiments obtained by those skilled in the art based on the embodiments of the present disclosure without creative efforts are within the scope of the present disclosure.

It should be noted that when a component is referred to as being "fixed" to another component, it can be directly on the other component or an intermediate component may be present. When a component is considered as "connected to" another component, it can be directly connected to another component or both may be connected to an intermediate component.

All technical and scientific terms used herein have the same meaning as commonly understood by one of ordinary skill in the art to which this disclosure belongs, unless otherwise defined. The terminology used in the description of the present disclosure is for the purpose of describing particular embodiments and is not intended to limit the disclosure. The term "and/or" used herein includes any and all combinations of one or more of the associated listed items.

Some embodiments of the present disclosure are described in detail below with reference to the accompanying drawings. The features of the embodiments and examples described below can be combined with each other without conflict.

The video processing method provided by various embodiments of the present disclosure may be executed by a video processing device, and the video processing device may be disposed on an unmanned aerial vehicle (UAV) capable of recording a video, or may be disposed on a remote control on the ground side. In one embodiment, the video processing method may be applied to a video recording task based on a UAV. In other embodiments, the video processing method may be applied to a video recording task of a movable device such as a robot that is able to move autonomously. In the following, various embodiments will be described in detail to illustrate the disclosed video processing method.

The disclosed video processing method adopts a video processing scheme that is combined with the flight trajectory. The video processing method may be applied to a UAV. According to the disclosed video processing method, the flight trajectory is determined, and in the process of autonomous flight according to the determined flight trajectory, the UAV may be able to capture images at various navigation positions using a camera device mounted on the UAV, and a first video segment composed of the captured environmental images may then be obtained at a certain point of the flight trajectory. When a certain position of the flight trajectory is reached, the UAV may be controlled to rotate at that position or the gimbal of the UAV may be controlled to make a circular rotation at that position, and environmental images can be captured during the rotation process. The captured environmental images may be stitched together to obtain a panoramic image. Finally, a second video segment may be generated based on the panoramic image, and by starting a playback from the second video segment, and gradually connecting with the first video segment captured on the flight trajectory, a target video may be generated.

The video processing method described in various embodiments of the present disclosure may be executed by a video processing device. The video processing device may first need to determine a flight trajectory of the UAV. FIG. 1 illustrates a schematic diagram of an exemplary flight trajectory according to various embodiments of the present disclosure. Referring to FIG. 1, a user 14 may determine the position of point A 12 and the position of point B 13 using a video processing device, and may further determine the flight trajectory of a UAV 11 based on point A 12 and point B 13. The video processing device may be able to control the UAV 11 to fly along a flight trajectory containing point A 12 and point B 13, capture the images during the flight through a camera device mounted on the UAV, and form a first video segment according to the captured images.

For example, after determining the flight trajectory containing point A 12 and point B 13, the video processing device may control the UAV 11 to start flying in accordance with the flight trajectory from any position in the flight trajectory, and capture images using the camera device mounted on the UAV 11 to obtain a first video segment. When the UAV 11 flies to a certain point following the flight trajectory, the video processing device may control the UAV 11 or the gimbal of the UAV 11 to make a circular rotation, and capture environmental images during the rotation to obtain a panoramic image, such that a second video segment may be generated based on the panoramic image. Further, a target video may be generated according to the first video segment and the second video segment. For example, the UAV 11 may fly in accordance with the flight trajectory shown in FIG. 1 from point A 12. While flying in accordance with the flight trajectory from point A 12 to point B 13, the UAV 11 may capture images using the camera device mounted on the UAV 11. When the UAV 11 flies to a height greater than 50 m in the air, for example, at point B 13, the UAV 11 may stop flying (e.g., stop translating movement), and the video captured during the process from point A 12 to point B 13 may be used as a first video segment, and the UAV 11 or the gimbal of the UAV 11 may be controlled to rotate at point B 13. During the rotation process, environmental images may be captured to obtain a panoramic image. A second video segment may then be generated based on the panoramic image. Further, a target video may be generated according to the first video segment and the second video segment.

It should be noted that, according to the embodiments of the present disclosure, when the video processing device determines the flight trajectory of the UAV, a trajectory generation control algorithm may be used. The trajectory generation control algorithm may mainly plan the flight trajectory for the camera device to record the first video segment from the start point to the end point of the flight, and also control the UAV to rotate at a certain point and control the camera device to capture the environmental images during the rotation process. According to various embodiments of the present disclosure, when determining the flight trajectory of the UAV, a variety of commonly used algorithms may be used, such as Bezier curves, 5-order-B-spline, and other algorithms, which are not limited in the embodiments of the present disclosure.

According to various embodiments of the present disclosure, by setting the positions of two points, the video processing device may determine a flight trajectory with an arbitrary shape, such as a straight line, a curve, a spiral, etc. In the process of determining the flight trajectory of the UAV, FIG. 1 may be used as example for illustration. As shown in FIG. 1, a curved trajectory from point A to point B is assumed to be the determined flight trajectory, the video processing device may obtain a first video segment by controlling the camera device to capture images during the flight trajectory. When the UAV reaches point B and stops flying (e.g., stop translating movement), the video processing device may control the UAV or the gimbal of the UAV to make a circular rotation at point B, and during the rotation process, environmental images may be captured to obtain a panoramic image. It should be noted that since the camera device of the UAV may not be an ultra-wide-angle camera device, but an ordinary camera device, the angle of view of the camera device may be limited, and only a small angle of view can be captured at a time. Therefore, the photographic angle may need to be planned to cover a wide range of perspectives. For example, when a form of circular scanning is adopted, the pitch angle of the gimbal of the UAV may be fixed first, and then by controlling the rotation of the yaw angle, the camera device may be controlled to capture environmental images of a full circle, and then the pitch angle may be gradually turned, and by controlling the rotation of the yaw angle, the camera device may be controlled to capture different environmental images.

Figure 2:
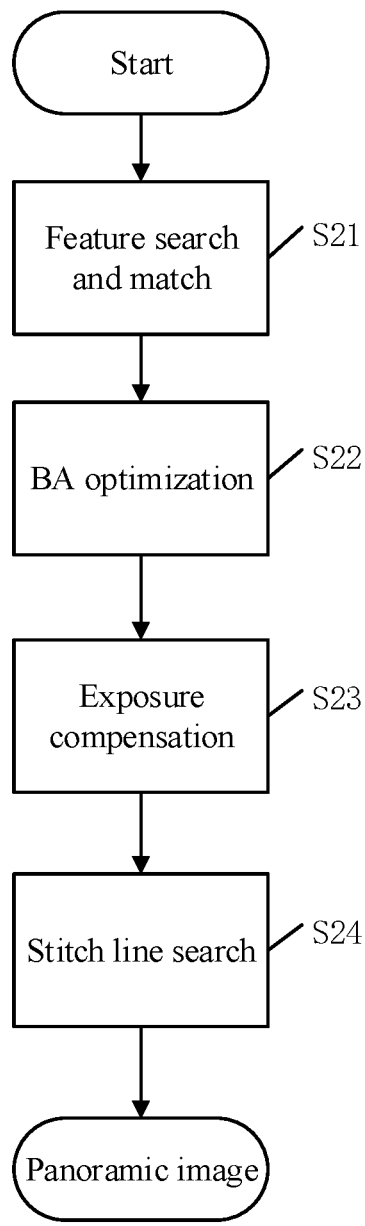
FIG. 2 illustrates a schematic flowchart of an exemplary stitching algorithm according to various embodiments of the present disclosure.

According to various embodiments of the present disclosure, the video processing device may be able to obtain a panoramic image by stitching the captured environmental images. FIG. 2 illustrates a schematic flowchart of an exemplary stitching algorithm according to various embodiments of the present disclosure. Referring to FIG. 2, when the stitching process starts, the gimbal of the UAV may be rotated at different pitch angles, and a plurality of images may be obtained through the camera device. Different images of the plurality of images may have a certain degree of overlapping, and the overlap ratio may be in a range between 0.2 and 0.3. As shown in FIG. 2, in an exemplary step S21, the features of these images may be searched and compared to obtain matched features. That is, the features of the images may be found out, and a matching process may be performed on the features; and in an exemplary step S22, the matched features may be optimized through bundle adjustment (BA), such that the relative position between images may be more accurate. Further, in an exemplary step S23, exposure compensation may be performed on the images; in an exemplary step S24, a stitching line may be found out; and finally through curve warping deformation, a panoramic image may be obtained. It should be noted that, in the embodiments of the present disclosure, the camera device may be calibrated, and the calibration values may be used as the initial values of the parameters in the camera device. In addition, purposed feature matching may be performed based on the captured environmental images, and thus errors generated during the matching process may be reduced.

Figure 3:
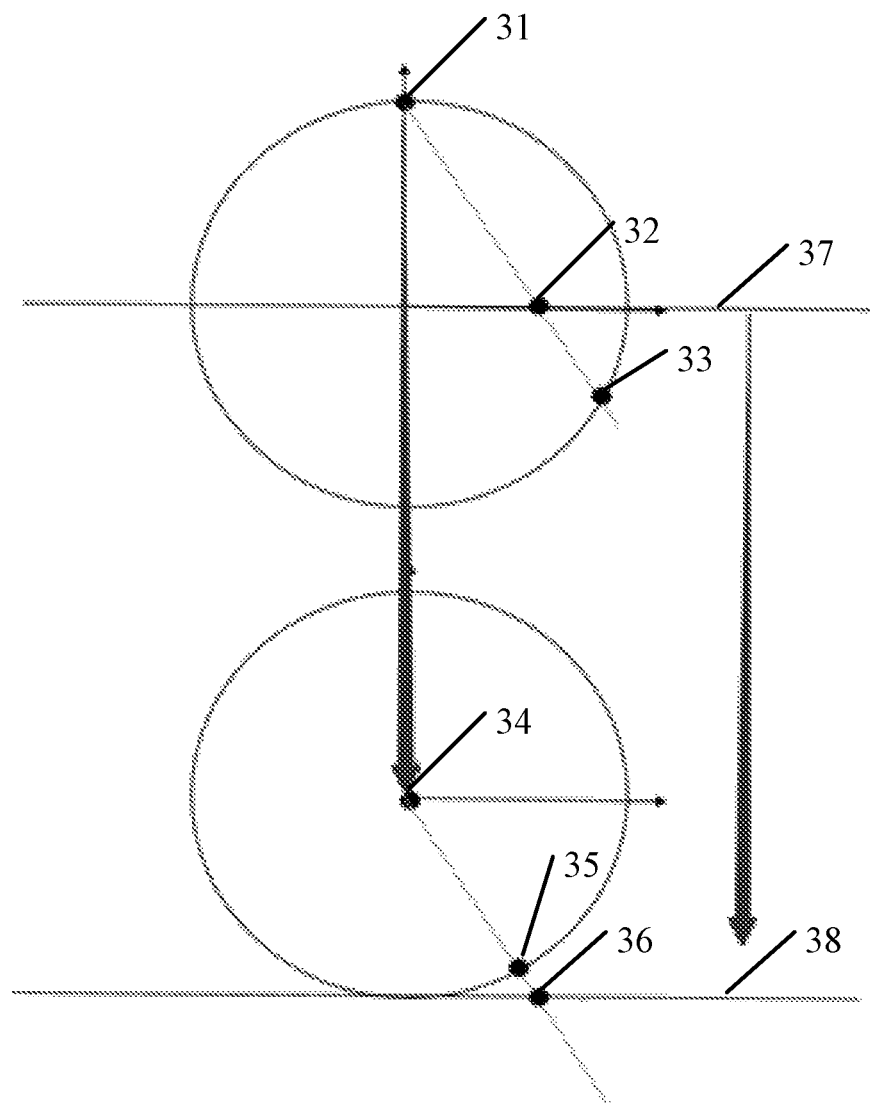
FIG. 3 illustrates a schematic diagram of an exemplary video generation process according to various embodiments of the present disclosure.

According to various embodiments of the present disclosure, the video processing device may generate a second video segment based on the panoramic image. FIG. 3 illustrates a schematic diagram of an exemplary video generation process according to various embodiments of the present disclosure. Referring to FIG. 3, a transformation process of the video processing device generating the second video segment based on the panoramic image is illustrated as an example. In FIG. 3, 31 represents a first viewing point of the panoramic image, 32 represents a first imaging point, 33 represent a first panoramic point, 37 represents a first projection plane, 34 represents a second viewing point of the panoramic image, 35 represents a second panoramic point, 36 represents a second imaging point, and 38 represents a second projection plane. The asteroid-like panoramic projection is actually a projection method in which the viewing point is the first viewing point 31 in FIG. 3, and the projection plane is the first projection plane 37, that is, a plane passing through the center of the asteroid-like circle. The photography of a normal viewing angle is a projection method in which the viewing point is the second viewing point 34, that is, the center of the asteroid-like circle, and the projection plane is the second projection plane 38. By moving the viewing point from the first viewing point 31 to the second viewing point 34, and also moving the projection plane from the first projection plane 37 to the second projection plane 38, the panoramic image may be gradually expanded and played to obtain the second video segment.

Figure 4:
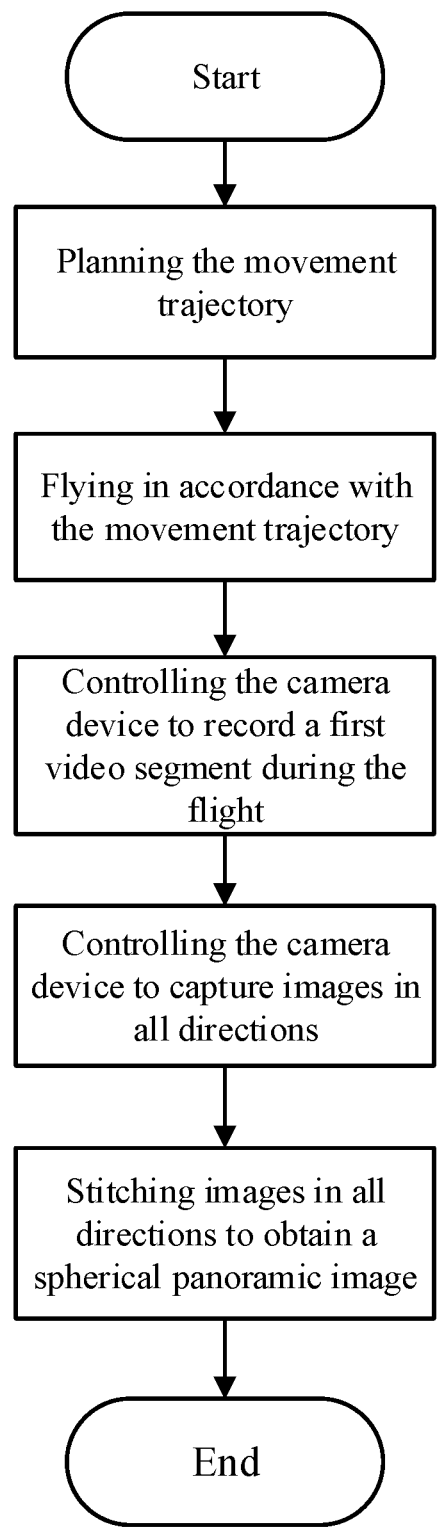
FIG. 4 illustrates a schematic flowchart of an exemplary process of generating a panoramic image according to various embodiments of the present disclosure.

FIG. 4 illustrates a schematic flowchart of an exemplary process of generating a panoramic image according to various embodiments of the present disclosure. Referring to FIG. 4, according to various embodiment of the present disclosure, the video processing device may first determine the flight trajectory of the UAV, and then control the UAV to fly along the determined flight trajectory and control the camera device mounted on the UAV to obtain a first video segment during the flight of the UAV. When the UAV reaches a second photography point, the video processing device may control the camera device of the UAV to capture environmental images, and then stitch various environmental images to obtain a panoramic image. A second video segment may be generated based on the panoramic image, and a target video may then be generated according to the first video segment and the second video segment.

Figure 5:
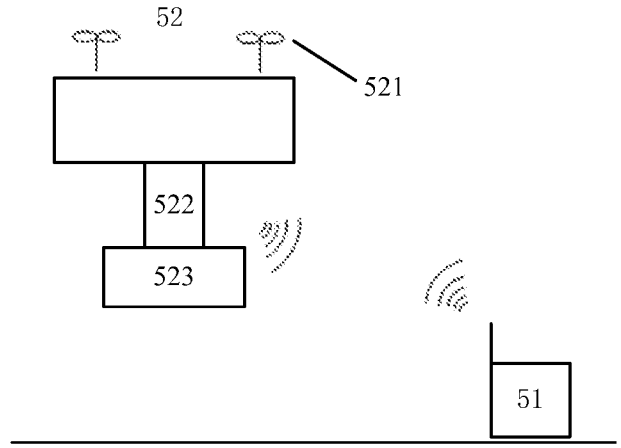
FIG. 5 illustrates a schematic structural diagram of an exemplary unmanned aerial vehicle system according to various embodiments of the present disclosure.

FIG. 5 illustrates a schematic structural diagram of an exemplary unmanned aerial vehicle system according to various embodiments of the present disclosure. Referring to FIG. 5, the UAV system may include a video processing device 51 and a UAV 52. The video processing device 51 may be a control terminal of the UAV 52. For example, the video processing device 51 may be one or more of a remote controller, a smart phone, a tablet computer, a laptop computer, a ground station, a wearable device (such as watch, bracelet, etc.). The UAV 52 may be a rotor type UAV, such as a quad-rotor UAV, a six-rotor UAV, and an eight-rotor UAV, or may be a fixed-wing UAV. The UAV 52 may include a propulsion system 521, which is used to provide propulsive force for the UAV. The propulsion system 521 may include one or more of a propeller, a motor, and an electronic speed control (ESC). The UAV may also include a gimbal 522 and a camera device 523. The camera device 523 may be mounted on the main body of the UAV through the gimbal 522. The camera device 523 may be used to capture images or record videos during the flight of the UAV, and the selection of the camera device 523 may include but not limited to a multispectral imager, a hyperspectral imager, a visible light camera, an infrared camera, etc. The gimbal may be a multi-axis transmission and stabilization system. Through a motor of the gimbal, the rotation angle of the rotating shaft may be adjusted to compensate the photographic angle of the camera device, and by setting an appropriate buffer mechanism, shake of the imaging device may be prevented or reduced.

In one embodiment, the video processing device 51 may be configured with an interactive device that interacts with a user. The interactive device may be one or more of a touch display screen, a keyboard, a button, a joystick, and a pulsator. A user interface may be provided on the interactive device, and a user may perform a click operation on the user interface of the video processing device 51. Each click operation may be able to confirm one point. After the video processing device 51 receives two points confirmed by the click operation, the video processing device 51 may connect the two points such that a flight trajectory may be formed by the two connected points. The flight trajectory may be a straight line trajectory or a curved trajectory. Therefore, by controlling the UAV 52 may to fly in accordance with the flight trajectory, the camera device 523 may also move in accordance with the flight trajectory. It should be noted that the click operation on the user interface is only an exemplary method for confirming the flight trajectory, and the manner of confirming the flight trajectory is not limited in the embodiments of the present disclosure.

In one embodiment, during the process of the UAV moving in accordance with the flight trajectory, the video processing device 51 may control the camera device 523 of the UAV 52 to record a first video segment when the UAV 52 reaches a first photography point. When a second photography point is reached as the UAV continues moving, the video processing device 51 may control the camera device 523 of the UAV 52 to capture environmental images to obtain a panoramic image, and generate a second video segment based on the panoramic image. The video processing device 51 may generate the target video according to the first video segment and the second video segment.

Figure 6:
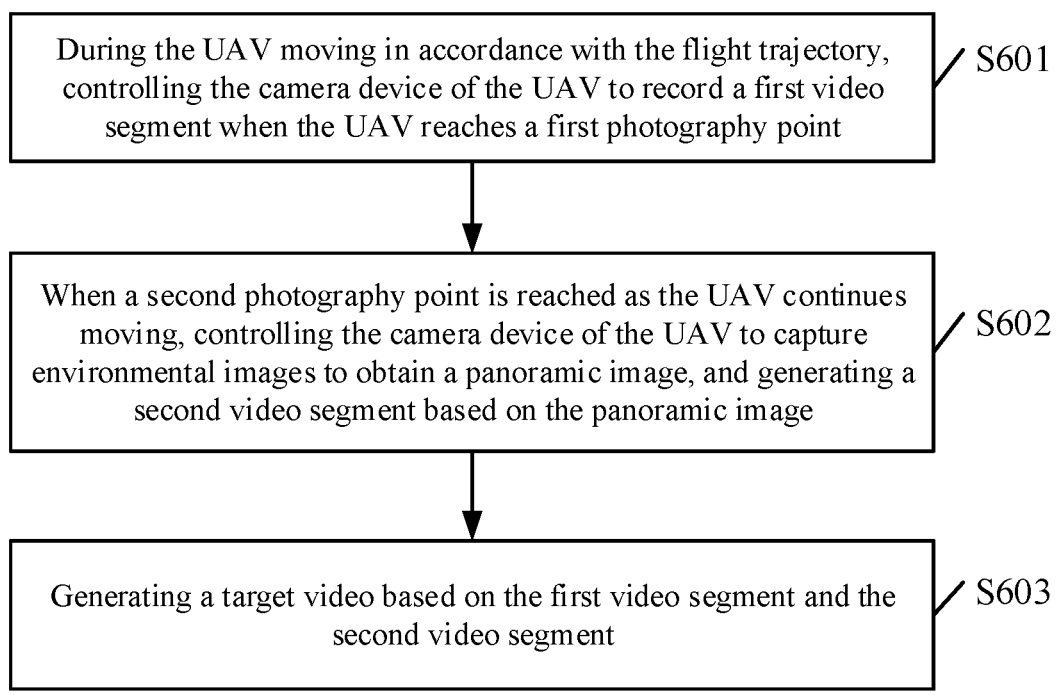
FIG. 6 illustrates a schematic flowchart of an exemplary video processing method according to various embodiments of the present disclosure.

FIG. 6 illustrates a schematic flowchart of an exemplary video processing method according to various embodiments of the present disclosure. Referring to FIG. 6, the video processing method may be executed by a video processing device. A detailed description of the video processing device is provided above. In one embodiment, the video processing method may include the following steps.

In S601, the video processing method may include during the UAV moving in accordance with the flight trajectory, controlling the camera device of the UAV to record a first video segment when the UAV reaches a first photography point.

In one embodiment, during the UAV moving in accordance with the flight trajectory, the video processing device may control the camera device of the UAV to obtain a first video segment when it reaches the first photography point. For example, the video processing device may first determine two points, and then determine the flight trajectory of the UAV based on the two points. After determining the flight trajectory of the UAV, the UAV may be controlled to move according to the determined flight trajectory. During the movement, the video processing device may control the camera device of the UAV to capture images and obtain a first video segment when it reaches the first photography point.

For example, referring to FIG. 1, the video processing device may first determine two points, e.g., point A and point B, and then based on point A and point B, determine a connection curve between point A and point B as the flight trajectory of the UAV. The video processing device may control the UAV to move from point A to point B in accordance with the flight trajectory containing point A and point B shown in FIG. 1. During the movement from point A to point B, the video processing device may control the camera device of the UAV to start capturing images from point A or start capturing images when reaching a first photography point, and to stop capturing images when reaching a second photography point. As such, a first video segment may be obtained. It should be noted that the first photography point may be any point on the flight trajectory between point A and point B, including point A and point B; and the second photography point may be any point on the flight trajectory between point A and point B, including point A and point B.

In one embodiment, the first photography point and the second photography point may be two points on the flight trajectory. For example, as shown in FIG. 1, the first photography point may be point A on the flight trajectory and the second photography point may be point B on the flight trajectory.

In one embodiment, the first photography point may be a first position point selected according to a received selection operation on the flight trajectory, and the second photography point may be a second position point selected according to a received selection operation on the flight trajectory.

In one embodiment, the video processing device may obtain a first position point and a second position point, and determine the flight trajectory of the UAV based on the position information of the first position point and the second position point. For example, the first position point may be used as the first photography point, and the second position point may be used as the second photography point.

In one embodiment, the first photography point and the second photography point may be two time points during the UAV moving in accordance with the flight trajectory. For example, by setting a photography time interval, the video processing device may determine two time points with a time interval equal to the photography time interval, and then may use the determined two time points as the first photography point and the second photography point, respectively.

For example, the video processing device may preset the photography time interval of the camera device of the UAV to be 5 seconds, and the first photography point may be at the time point 10:00:05, so that the time point of the second photography point may be determined as 10:00:10.

In one embodiment, in the process of determining the flight trajectory of the UAV based on the position information of the first position point and the second position point, the video processing device may, based on the determined position information of the first position point and the second position point and according to a first trajectory generation rule, generate a linear trajectory between first photography point and the second photography point, and may determine the linear trajectory as the flight trajectory. It should be noted that the first trajectory generation rule may include a trajectory generation control algorithm. There are many commonly used algorithms for determining the flight trajectory of a UAV, such as Bezier curves, 5-order-B-spline, and other algorithms, which are not limited in the embodiments of the present disclosure.

In other embodiments, when determining the flight trajectory of the UAV, the video processing device may, based on the position information of the first position point and the second position point and according to a second trajectory generation rule, generate a curved trajectory between first photography point and the second photography point, and may determine the curved trajectory as the flight trajectory. It should be noted that by setting the photography points, the video processing device may plan a trajectory of any shape, such as a straight line, a curve, a spiral, etc., and then discretize the entire curve (i.e. the planned trajectory) as the passing points of the UAV to guide the flight of the UAV.

In S602, the video processing method may include, when a second photography point is reached as the UAV continues moving, controlling the camera device of the UAV to capture environmental images to obtain a panoramic image, and generating a second video segment based on the panoramic image.

According to various embodiments of the present disclosure, during the UAV moving in accordance with the flight trajectory, when a second photography point is reached, the video processing device may control the camera device of the UAV to capture environmental images to obtain a panoramic image. In addition, according to the panoramic image, a second video segment may be generated. In one embodiment, the flight trajectory of the UAV is assumed to be consistent with the example shown in FIG. 1, e.g., the flight trajectory may be a curved trajectory between point A and point B. In the process of the UAV moving in accordance with the flight trajectory, when the UAV reaches point B (second photography point), the video processing device may control the UAV to make a circular rotation at point B, and at the same time, control the camera device of the UAV to capture environmental images during the rotation process of the UAV to obtain a panoramic image. As such, a second video segment may be generated based on the panoramic image.

In one embodiment, the last video frame of the first video segment may be used as the first image of the panoramic image. When the second photography point is reached as the UAV continues moving, the video processing device may obtain the last video frame of the first video segment, and use this video frame as the first image of the panoramic image. For example, referring to FIG. 1, a UAV may capture images while flying in accordance with a flight trajectory containing point A and point B. When the UAV it reaches point B, the UAV may stop flying, and the first video segment may be obtained from the images captured on the flight trajectory. The last video frame of the first video segment is assumed to be picture a, and the video processing device may use picture a as the first image of the panoramic image. The video processing device may control the camera device of the UAV to capture environmental images starting from picture a to obtain a panoramic image. The video processing device may further expand and display the panoramic image, and generate a second video segment according to the images in the entire expansion process.

In one embodiment, the video processing device may perform an expansion process on the panoramic image, and generate a second video segment based on the images obtained during the expansion process. The process of generating the second video segment based on the panoramic image can be described by using FIG. 3 as an example. Referring to FIG. 3, the obtained panoramic image may be a spherical panoramic image, and the gradual expansion process may start from the first viewing point 31 (Arctic point) of the panoramic image. The expansion method may include gradually moving the viewing point from the first viewing point 31 to the second viewing point 34 (sphere center) of the spherical panoramic image, and expanding the panoramic image. In the meantime, the projection plane may, following the movement of the viewing point, move from a plane passing through the spherical center plane (first projection plane 37) of the spherical panoramic image to a plane (second projection plane 38) passing through the Antarctic point of the spherical panoramic image. As such, the panoramic image may be gradually expanded to generate the second video segment.

In one embodiment, when the second photography point is reached as the UAV continues moving, the video processing device may control the camera device of the UAV to capture environmental images to obtain a panoramic image, and generate a second video based on the panoramic image. In this process, the video processing device may, when the UAV reaches the second photography point as the UAV continues moving, control the UAV to rotate such that the camera device of the UAV may capture environmental images to obtain a panoramic image. Further, a second video segment may be generated based on the panoramic image. For example, the video processing device may control the UAV to rotate when the UAV reaches point B (the second photography point) while continuing the movement along the flight trajectory as shown in FIG. 1, such that the camera device of the UAV may be able to capture environmental images to obtain a panoramic image, and may generate a second video segment based on the panoramic image.

In one embodiment, during the process of controlling the UAV to rotate at the second photography point, the video processing device may control the UAV to make a circular rotation in a clockwise direction, or control the UAV to make a circular rotation in a counterclockwise direction to obtain the panoramic image. For example, referring to FIG. 1, the UAV moves from point A to point B, and point B is assumed to be the second photography point; when the UAV moves to point B, the video processing device may control the UAV to make a circular rotation at point B in the clockwise direction. In another example, the UAV moves from point A to point B as shown in FIG. 1, and point B is assumed to be the second photography point; when the UAV moves to point B, the video processing device may control the UAV to make a circular rotation at point B in the counterclockwise direction.

In S603, the video processing method may include generating a target video based on the first video segment and the second video segment.

According to various embodiments of the present disclosure, the video processing device may generate a target video based on the first video segment and the second video segment. For example, the video processing device may obtain a first video segment during the process of moving from point A to point B, and after reaching point B, the video processing device may control the UAV or the gimbal of the UAV to make a circular rotation, and during the rotation, the camera device may be controlled to capture environmental images to obtain a panoramic image, and a second video segment may then be generated based on the panoramic image. Further, a target video may be generated based on the first video segment and the second video segment.

According to various embodiments of the present disclosure, in the process of the UAV moving in accordance with a flight trajectory, the video processing device controls the camera device of the UAV to obtain the first video segment when the UAV moves to the first photography point, and when the second photography point is reached as the UAV continues moving, the camera device of the UAV is controlled to capture environmental images to obtain a panoramic image. A second video segment is generated based on the panoramic image, and a target video is then generated based on the first video segment and the second video segment. As such, an environmental video combined with the flight trajectory and including the panoramic image may be generated, which meets the user's demands on the automation, intelligent photography and processing of environmental videos including panoramic images.

Figure 7:
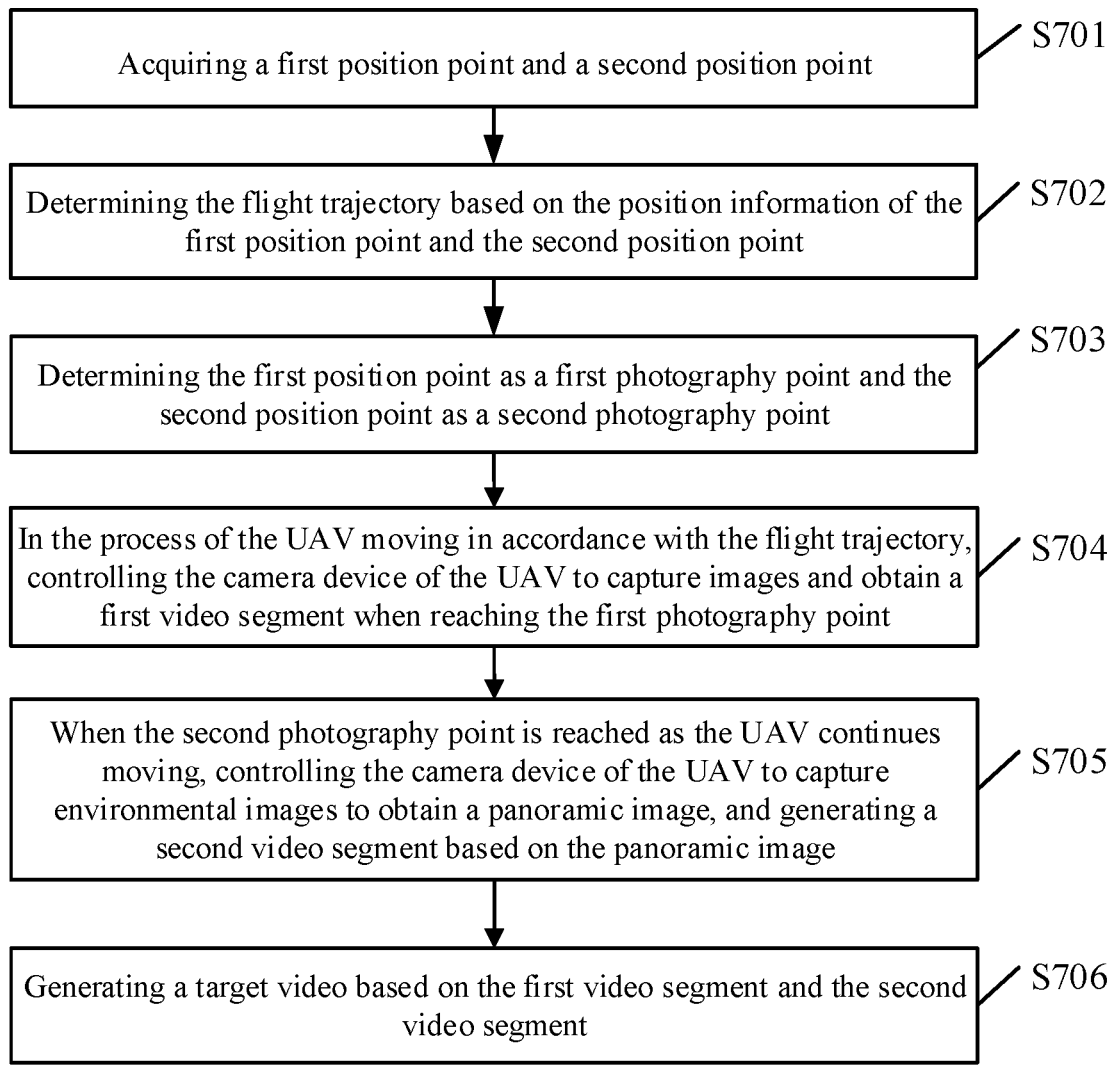
FIG. 7 illustrates a schematic flowchart of another exemplary video processing method according to various embodiments of the present disclosure.

FIG. 7 illustrates a schematic flowchart of another exemplary video processing method according to various embodiments of the present disclosure. Referring to FIG. 7, the video processing method may be executed by a video processing device. A detailed description of the video processing device is provided above. The difference between the method illustrated in FIG. 7 and the method illustrated in FIG. 6 is that in the method illustrated in FIG. 7, the flight trajectory of the UAV is determined by acquiring a first position point and a second position point, and when the UAV reaches a second photography point as the UAV continues moving, through the control of the rotation of the gimbal or the UAV, the camera device is controlled to capture environmental images during the rotation process of the gimbal or the UAV, and the environmental images are further stitched to obtain a panoramic image. The video processing method may include the following exemplary steps.

In S701, the video processing method may include acquiring a first position point and a second position point.

According to various embodiments of the present disclosure, the video processing device may obtain a first position point and a second position point by receiving click operations of a user. For example, referring to FIG. 1, when the video processing device receives click operations of a user, the video processing device may determine point A as the first position point and point B as the second position point. It should be noted that the first position point and the second position point may be any point according to the click operation of the user. For example, as shown in FIG. 1, the first position point and the second position point may be point A and point B, respectively. In other examples, the first position point and the second position point may be points at any other appropriate positions, which are not specifically limited by the embodiments of the present disclosure.

In S702, the video processing method may include determining the flight trajectory based on the position information of the first position point and the second position point.

According to various embodiments of the present disclosure, the video processing device may determine the flight trajectory of the UAV according to the obtained position information of the first position point and the second position point. For example, referring to FIG. 1, the video processing device may, based on the obtained position information of point A (first position point) and point B (second position point), determine a linear trajectory or a curved trajectory between point A and point B as shown in FIG. 1, and determine the linear trajectory or the curved trajectory as the flight trajectory of the UAV.

In S703, the video processing method may include determining the first position point as a first photography point and the second position point as a second photography point.

According to various embodiments of the present disclosure, the video processing device may use the first position point as the first photography point, and use the second position point as the second photography point. The first photography point and the second photography point may be two points on the flight trajectory; the first photography point may be a first position point selected according to a received selection operation on the flight trajectory; and the second photography point may be a second position point selected according to a received selection operation on the flight trajectory.

In S704, the video processing method may include, in the process of the UAV moving in accordance with the flight trajectory, controlling the camera device of the UAV to capture images and obtain a first video segment when reaching the first photography point.

According to various embodiments of the present disclosure, in the process of moving in accordance with the flight trajectory, the video processing device may control the camera device of the UAV to obtain a first video segment when the UAV reaches the first photography point. For example, the video processing device may determine two points first, and then determine the flight trajectory of the UAV based on the two points. After determining the flight trajectory of the UAV, the video processing device may control the UAV to move in accordance with the determined flight trajectory. During the movement, the video processing device may control the camera device of the UAV to capture a first video segment when it reaches the first photography point. For example, referring to FIG. 1, the video processing device may first determine two points: point A and point B, and then determine a curve trajectory between point A and point B as the flight trajectory of the UAV. The video processing device may control the UAV to move from point A to point B in accordance with the flight trajectory that contains point A and point B as shown in FIG. 1. In the process of moving from point A to point B, the video processing device may control the camera device of the UAV to start capturing from point A, and obtain a first video segment when it stops flying or stop capturing at a certain point on the flight trajectory.

In S705, the video processing method may include, when the second photography point is reached as the UAV continues moving, controlling the camera device of the UAV to capture environmental images to obtain a panoramic image, and generating a second video segment based on the panoramic image.

According to various embodiments of the present disclosure, when the second photography point is reached while the UAV continues moving, the video processing device may control the camera device of the UAV to capture environmental images to obtain a panoramic image, and generate a second video segment based on the panoramic image.

In one embodiment, the video processing device may control the gimbal to rotate. The camera device of the UAV may follow the rotation of the gimbal to capture environmental images and obtain the panoramic image. For example, when the video processing device controls the camera device of the UAV to capture environmental images and obtain the panoramic image, the video processing device may adjust the pitch angle of the gimbal of the UAV to a first pitch angle, and by turning the yaw angle of the gimbal, control the gimbal to make a circular rotation. The video processing device may obtain a first environmental image captured by the camera device during the rotation following the movement of the gimbal. After controlling the rotation for one round, the video processing device may adjust the pitch angle of the gimbal to a second pitch angle, and by turning the yaw angle of the gimbal, control the gimbal to make a circular rotation. The video processing device may obtain a second environmental image captured by the camera device during the rotation following the movement of the gimbal. Further, the first environmental image and the second environmental image may be stitched to obtain a panoramic image.

In one embodiment, during the process of stitching the first environmental image and the second environmental image by the video processing device to obtain the panoramic image, the video processing device may obtain a first feature set of the first environmental image and a second feature set of the second environmental image; a feature matching process may be performed according to the first feature set and the second feature set to obtain a matched feature set; and according to the matched feature set, a stitching line between the first environmental image and the second environmental image may be determined; and a stitching process may be performed on the first environmental image and the second environmental image according to the determined stitching line to obtain the panoramic image.

It should be noted that, according to various embodiments of the present disclosure, when the first environmental image and the second environmental image are stitched together, the camera device of the UAV may be calibrated, and the calibration values may be used as the initial values of the parameters in the camera device. Using the imu information of an inertial measurement unit as the initial value of the BA algorithm may reduce the number of iterations, and using the known relationship between any two images of the plurality of images to perform purposed feature matching, thereby reducing matching errors.

In one embodiment, when the second photography point is reached as the UAV continues moving, the video processing device may control the UAV to rotate. The camera device of the UAV may follow the rotation of the UAV to capture environmental images and obtain the panoramic image. For example, in the process of controlling the rotation of the UAV, the video processing device may control the UAV to rotate in a clockwise direction, or control the UAV to rotate in a counterclockwise direction.

In S706, the video processing method may include generating a target video based on the first video segment and the second video segment.

According to various embodiments of the present disclosure, the video processing device may generate a target video based on the first video segment and the second video segment. For example, referring to FIG. 1, the video processing device may obtain a first video segment during the process of moving from point A to point B. After reaching point B, the video processing device may control the UAV or the gimbal of the UAV to make a circular rotation, and during the rotation, the camera device may be controlled to obtain a second video segment. A target video may then be generated based on the first video segment and the second video segment.

In one embodiment, after the video processing device generates the target video based on the first video segment and the second video segment, when the video processing device detects a playback instruction for the target video, the video processing device may start to play the target video from the second video segment; or, may start to play the target video from the first video segment. For example, in the process of playing the target video, the video processing device may start playing the target video from the second video segment, and may gradually transition to play the first video segment from the first image of the second video segment (that is, the last image of the first video segment) during playback. Alternatively, in the process of playing the target video, the video processing device may start playing the target video from the first video segment, and may gradually transition to play the second video segment from the last video frame of the first video segment during playback.

In one embodiment, after the video processing device generates the target video based on the first video segment and the second video segment, when the video processing device detects a sharing operation instruction for the target video, the video processing device may share the target video. For example, after the video processing device generates the target video based on the first video segment and the second video segment, when detecting an operation instruction for sharing the target video to an APP (such as WeChat, QQ, etc.), the video processing device may share the target video to a designated location of (such as WeChat friends, WeChat friends circles, QQ friends, etc.) the APP.

According to various embodiments of the present disclosure, the video processing device may determine a flight trajectory of the UAV through the obtained position information of a first position point and a second position point, and use the first position point as a first photography point and the second position point as a second photography point. The video processing device may control the UAV to capture a first video segment when it reaches the first photography point during the movement in accordance with the flight trajectory. When the UAV continues moving to the second photography point, the video processing device may control the camera device of the UAV to capture environmental images to obtain a panoramic image, and generate a second video segment based on the panoramic image. The video processing device may further generate a target video based on the first video segment and the second video segment. As such, an environmental video combined with the flight trajectory and including the panoramic image may be generated, which meets the user's demands on the automation, intelligent photography and processing of such videos.

Figure 8:
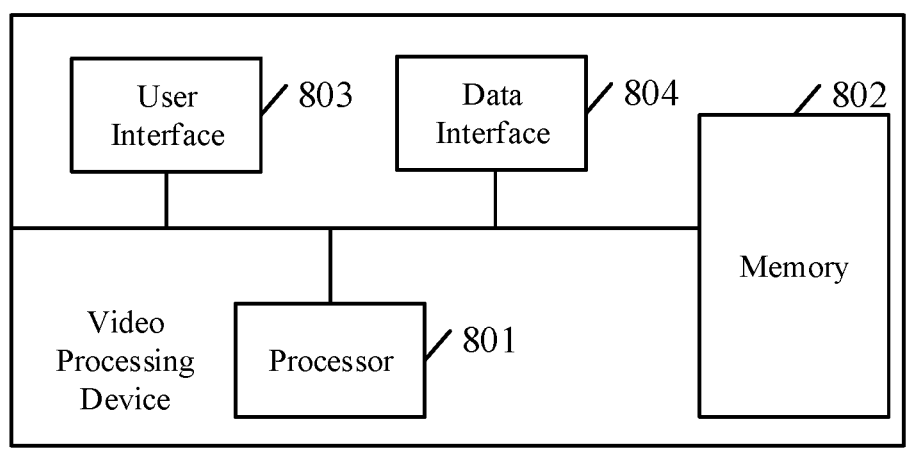
FIG. 8 illustrates a schematic structural diagram of an exemplary video processing device according to various embodiments of the present disclosure.

The present disclosure also provides a video processing device. FIG. 8 illustrates a schematic structural diagram of an exemplary video processing device according to various embodiments of the present disclosure. Referring to FIG. 8, the video processing device may include a processor 801, a memory 802, a user interface 803, and a data interface 804. The user interface 803 may be configured to output a target video.

In one embodiment, the memory 802 may include a volatile memory or a non-volatile memory. In other embodiments, the memory 802 may include a combination of a volatile memory or a non-volatile memory. In one embodiment, the processor 801 may be a central processing unit (CPU). The processor 801 may also include a hardware chip. The hardware chip may be an application-specific integrated circuit (ASIC), a programmable logic device (PLD), or a combination thereof. The PLD may be a complex programmable logic device (CPLD), a field-programmable gate array (FPGA), or any combination thereof.

In one embodiment, the memory 802 may be configured to store program instructions. The processor 801 may call program instructions stored in the memory 802 to perform the following exemplary steps:

when the UAV moves in accordance with a flight trajectory, controlling a camera device of the UAV to obtain a first video segment when reaching a first photography point;

when a second photography point is reached as the UAV continues moving, controlling the camera device of the UAV to capture environmental images to obtain a panoramic image, and generating a second video segment based on the panoramic image;

generating a target video based on the first video segment and the second video segment.

In one embodiment, the first photography point and the second photography point may be two points on the flight trajectory.

In one embodiment, the first photography point may be a first position point selected according to a received selection operation on the flight trajectory, and the second photography point may be a second position point selected according to a received selection operation on the flight trajectory.

In one embodiment, the processor 801 may call program instructions stored in the memory 802 to further perform the following exemplary steps:

acquiring a first position point and a second position point;

based on the position information of the first position point and the second position point, determining the flight trajectory of the UAV; and using the first position point as the first photography point, and using the second position point as the second photography point.

In one embodiment, the first photography point and the second photography point may be two time points during the UAV moving in accordance with the flight trajectory.

In one embodiment, the processor 801 may call program instructions stored in the memory 802 to further perform the following exemplary step:

based on the position information of the first position point and the second position point, and according to a first trajectory generation rule, generating a linear trajectory between first photography point and the second photography point; and determining the linear trajectory as the flight trajectory.

In one embodiment, the processor 801 may call program instructions stored in the memory 802 to further perform the following exemplary step:

based on the position information of the first position point and the second position point, and according to a second trajectory generation rule, generating a curved trajectory between first photography point and the second photography point; and determining the curved trajectory as the flight trajectory.

In one embodiment, the last video frame of the first video segment may be used as the first image of the panoramic image.

In one embodiment, the processor 801 may call program instructions stored in the memory 802 to further perform the following exemplary step:

when the second photography point is reached as the UAV continues moving, controlling the gimbal to rotate, where the camera device of the UAV follows the rotation of the gimbal to obtain the panoramic image.

In one embodiment, the processor 801 may call program instructions stored in the memory 802 to further perform the following exemplary step:

when the second photography point is reached as the UAV continues moving, controlling the UAV to rotate, where the camera device of the UAV follows the rotation of the UAV to obtain the panoramic image.

In one embodiment, the processor 801 may call program instructions stored in the memory 802 to further perform the following exemplary step:

controlling the UAV to make a circular rotation in a clockwise direction, or controlling the UAV to make a circular rotation in a counterclockwise direction.

In one embodiment, the processor 801 may call program instructions stored in the memory 802 to further perform the following exemplary steps:

adjusting a pitch angle of the gimbal of the UAV to a first pitch angle;

by turning a yaw angle of the gimbal, controlling the gimbal to make a circular rotation, and obtaining a first environmental image captured by the camera device during the rotation following the movement of the gimbal;

after controlling the rotation for one round, adjusting the pitch angle of the gimbal to a second pitch angle;

by turning the yaw angle of the gimbal, controlling the gimbal to make a circular rotation, and obtaining a second environmental image captured by the camera device during the rotation following the movement of the gimbal; and stitching the first environmental image with the second environmental image to obtain the panoramic image.

In one embodiment, the processor 801 may call program instructions stored in the memory 802 to further perform the following exemplary steps:

obtaining a first feature set of the first environmental image and a second feature set of the second environmental image;

performing feature matching according to the first feature set and the second feature set to obtain a matched feature set;

determining a stitching line between the first environmental image and the second environmental image according to the matched feature set; and according to the determined stitching line, stitching the first environmental image with the second environmental image to obtain the panoramic image.

In one embodiment, the processor 801 may call program instructions stored in the memory 802 to further perform the following exemplary steps:

when detecting a playback instruction for the target video, starting to play the target video from the second video segment; or starting to play the target video from the first video segment.

In one embodiment, the processor 801 may call program instructions stored in the memory 802 to further perform the following exemplary step:

when detecting a sharing operation instruction for the target video, sharing the target video.

For the implementation of the processor 801, reference may be made to the description of related content in the embodiments provided above, and the details are not described herein again.

According to various embodiments of the present disclosure, in the process of the UAV moving in accordance with a flight trajectory, the video processing device controls the camera device of the UAV to obtain the first video segment when the UAV moves to the first photography point, and when the second photography point is reached as the UAV continues moving, the camera device of the UAV is controlled to capture environmental images to obtain a panoramic image. A second video segment is generated based on the panoramic image, and a target video is then generated based on the first video segment and the second video segment. As such, an environmental video combined with the flight trajectory and including the panoramic image may be generated, which meets the user's demands on the automation, intelligent photography and processing of environmental videos including panoramic images.

The present disclosure also provides a UAV. The UAV may include a fuselage, a propulsion system, disposed on the fuselage and configured to provide propulsive force; and a processor. The processor may be configured to, when the UAV moves in accordance with a flight trajectory, control a camera device of the UAV to obtain a first video segment when reaching a first photography point; when a second photography point is reached as the UAV continues moving, control the camera device of the UAV to capture environmental images to obtain a panoramic image, and generate a second video segment based on the panoramic image; and generate a target video based on the first video segment and the second video segment.

In one embodiment, the processor may be further configured to:

acquire a first position point and a second position point;

based on the position information of the first position point and the second position point, determine the flight trajectory of the UAV; and use the first position point as the first photography point, and use the second position point as the second photography point.

In one embodiment, the processor may be further configured to:

when the second photography point is reached as the UAV continues moving, control the gimbal to rotate, where the camera device of the UAV follows the rotation of the gimbal to obtain the panoramic image.

In one embodiment, the processor may be further configured to:

adjust a pitch angle of the gimbal of the UAV to a first pitch angle;

by turning a yaw angle of the gimbal, control the gimbal to make a circular rotation, and obtain a first environmental image captured by the camera device during the rotation following the movement of the gimbal;

after controlling the rotation for one round, adjust the pitch angle of the gimbal to a second pitch angle;

by turning the yaw angle of the gimbal, control the gimbal to make a circular rotation, and obtain a second environmental image captured by the camera device during the rotation following the movement of the gimbal; and stitch the first environmental image with the second environmental image to obtain the panoramic image.

In one embodiment, the processor may be further configured to:

obtain a first feature set of the first environmental image and a second feature set of the second environmental image;

perform feature matching according to the first feature set and the second feature set to obtain a matched feature set;

determine a stitching line between the first environmental image and the second environmental image according to the matched feature set; and according to the determined stitching line, stitch the first environmental image with the second environmental image to obtain the panoramic image.

For the implementation of the processor in the UAV, reference may be made to the video processing method of the above embodiments corresponding to FIG. 6 or FIG. 7, and details are not described herein again. The UAV may be a quad-rotor UAV, a six-rotor UAV, a multi-rotor UAV, and other types of unmanned aircraft. The propulsion system may include a motor, an ESC, and a propeller. The motor may be responsible for driving the propeller of the aircraft, and the ESC may be responsible for controlling the rotation speed of the motor of the aircraft.

The present disclosure also provides a video processing system, including a video processing device and a UAV. The video processing device may be configured to send a flight control instruction to the UAV, and the flight control instruction may be used to instruct the UAV to fly in accordance with a determined flight trajectory. The UAV may be configured to, in response to the flight control instruction, fly in accordance with the flight trajectory, and control a camera device mounted on the UAV to capture images.

The video processing device may be further configured to, when the UAV moves in accordance with a flight trajectory, control a camera device of the UAV to obtain a first video segment when reaching a first photography point; when a second photography point is reached as the UAV continues moving, control the camera device of the UAV to capture environmental images to obtain a panoramic image, and generate a second video segment based on the panoramic image; and generate a target video based on the first video segment and the second video segment.

In one embodiment, the video processing device may be configured to acquire a first position point and a second position point; based on the position information of the first position point and the second position point, determine the flight trajectory of the UAV; and use the first position point as the first photography point, and use the second position point as the second photography point.

In one embodiment, the video processing device may be configured to, based on the position information of the first position point and the second position point, and according to a first trajectory generation rule, generate a linear trajectory between first photography point and the second photography point; and determine the linear trajectory as the flight trajectory.

In one embodiment, the video processing device may be further configured to, based on the position information of the first position point and the second position point, and according to a second trajectory generation rule, generate a curved trajectory between first photography point and the second photography point; and determine the curved trajectory as the flight trajectory.

In one embodiment, the video processing device may be configured to, when the second photography point is reached as the UAV continues moving, control the gimbal to rotate, where the camera device of the UAV follows the rotation of the gimbal to obtain the panoramic image.

In one embodiment, the video processing device may be configured to, when the second photography point is reached as the UAV continues moving, control the UAV to rotate, where the camera device of the UAV follows the rotation of the UAV to obtain the panoramic image.

In one embodiment, the video processing device may be configured to control the UAV to make a circular rotation in a clockwise direction, or control the UAV to make a circular rotation in a counterclockwise direction.

In one embodiment, the video processing device may be configured to adjust a pitch angle of the gimbal of the UAV to a first pitch angle; by turning a yaw angle of the gimbal, control the gimbal to make a circular rotation, and obtain a first environmental image captured by the camera device during the rotation following the movement of the gimbal; after controlling the rotation for one round, adjust the pitch angle of the gimbal to a second pitch angle; by turning the yaw angle of the gimbal, control the gimbal to make a circular rotation, and obtain a second environmental image captured by the camera device during the rotation following the movement of the gimbal; and stitch the first environmental image with the second environmental image to obtain the panoramic image.

In one embodiment, the video processing device may be configured to obtain a first feature set of the first environmental image and a second feature set of the second environmental image; perform feature matching according to the first feature set and the second feature set to obtain a matched feature set; determine a stitching line between the first environmental image and the second environmental image according to the matched feature set; and according to the determined stitching line, stitch the first environmental image with the second environmental image to obtain the panoramic image.

In one embodiment, the video processing device may be configured to when detecting a playback instruction for the target video, start to play the target video from the second video segment; or start to play the target video from the first video segment.

In one embodiment, the video processing device may be configured to when detecting a sharing operation instruction for the target video, share the target video.

The present disclosure also provides a computer-readable storage medium. The computer-readable storage medium may store a computer program. When the computer program is executed by a processor, the video processing method described in the embodiments corresponding to FIG. 6 or FIG. 7 of the present disclosure may be implemented, and the video to processing device in the embodiments corresponding to FIG. 8 of the present disclosure may also be implemented. The details of the implementations of the video processing method and the video processing device are not described herein again.

The computer-readable storage medium may be an internal storage unit of the device according to any one of the embodiments described above, such as a hard disk or a memory of the device. The computer-readable storage medium may also be an external storage device of the device, such as a plug-in hard disk, a smart media card (SMC), a secure digital (SD) card, a flash card, etc., provided on the device. Further, in some embodiments, the computer-readable storage medium may include both an internal storage unit of the device and an external storage device. The computer-readable storage medium may be used to store the computer program and other programs and data required by the disclosed device and system. The computer-readable storage medium may also be used to temporarily store data that has been or will be outputted.

Those of ordinary skill in the art should understand that all or part of the processes in the method of the above embodiments can be implemented by using a computer program to instruct the related hardware. The program can be stored in a computer-readable storage medium. When the program is executed, the processes of the embodiments of the methods described above may be implemented. The storage medium may be a magnetic disk, an optical disk, a read-only memory (ROM), or a random access memory (RAM).

It should be noted that in the present disclosure, relational terms such as first and second are used only to distinguish one entity or operation from another entity or operation, and do not necessarily require or imply that these entities or operations have any such actual relationship or order. The term "comprising", "including" or any other variation is intended to encompass non-exclusive inclusion, such that a process, method, article, or device that includes a series of elements includes not only those elements but also other elements that are not explicitly listed, or elements that are inherent to such a process, method, article, or device. Without more restrictions, the elements defined by the sentence "including a . . . " do not exclude the existence of other identical elements in the process, method, article, or equipment that includes the elements.

It should be noted that, under the premise of no conflict, the embodiments described in this application and/or the technical features in each embodiment can be arbitrarily combined with each other, and the technical solution obtained after the combination should also fall into the protection scope of this application.

Those of ordinary skill in the art may understand that the units and algorithm steps of each example described in combination with the embodiments disclosed herein can be implemented by electronic hardware, or a combination of computer software and electronic hardware. Whether these functions are performed in hardware or software depends on the specific application and design constraints of the technical solution. Those of ordinary skill in the art can use different methods to implement the described functions for each specific application, but such implementation should not be considered to be beyond the scope of this application.

In the various embodiments provided by the present application, it should be understood that the disclosed systems, devices, and methods may be implemented in other manners. For example, the device embodiments described above are merely illustrative. For instance, in various embodiments of the present disclosure, the units are divided or defined merely according to the logical functions of the units, and in actual applications, the units may be divided or defined in another manner. For example, multiple units or components may be combined or integrated into another system, or some features can be ignored or not executed. In addition, the mutual coupling or direct coupling or communication connection shown or discussed may be an indirect coupling or communication connection through some interface, device or unit, and may be in an electrical, mechanical, or other form.

The units described as separate components may or may not be physically separated, and the components displayed as a unit may or may not be physical in a unit, that is, they may be located in one place, or may be distributed to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit.

Finally, it should be noted that the above embodiments are merely illustrative of, but not intended to limit, the technical solutions of the present invention; although the present disclosure has been described in detail with reference to the above embodiments, those skilled in the art should understand that the technical solutions described in the above embodiments may be modified, or part or all of the technical features may be equivalently replaced; and the modifications or substitutions do not depart from the scope of the technical solutions of the embodiments of the present disclosure.

What is claimed is:

1. A video processing method, applied to an unmanned aerial vehicle (UAV) equipped with a camera device for capturing videos, the method comprising:
controlling the camera device of the UAV to obtain a first video segment during the UAV flying in accordance with a flight trajectory from a first photography point to a second photography point;
in response to the UAV reaching the second photography point, controlling the camera device of the UAV to capture environmental images to obtain a panoramic image;
generating a second video segment based on the obtained panoramic image by using a process through moving a viewing point and a projection plane of the obtained panoramic image, the second video segment including images obtained during the process, and a last video frame of the first video segment captured at the second photography point being used as a first image of the second video segment; and
generating a target video based on gradually transitioning first video segment and the second video segment using the last video frame of the first video segment or the first image of the second video segment.

2. The method. according to claim 1, wherein:
the first photography point and the second photography point are two points on the flight trajectory.

3. The method according to claim 1, wherein:
the first photography point is a first position point on the flight trajectory and selected according to a received selection operation; or
the second photography point is a second position point on the flight trajectory and selected according to a received selection operation.

4. The method according to claim 1, further including:
acquiring a first position point and a second position point;
based on position information of the first position point and the second position point, determining the flight trajectory of UAV; and
using the first position point as the first photography point, and using the second position point as the second photography point.

5. The method according to claim 4, Wherein based on the position information of the first position point and the second position point, determining the flight trajectory of the UAV includes:
based on the position information of the first position point and the second position point, and according to a second trajectory generation rule, generating a curved trajectory between first photography point and the second photography point; and
determining the curved trajectory as the flight trajectory.

6. The method according to claim 1, wherein:
the first photography point and the second photography point are two time points during the UAV moving in accordance with the flight trajectory, wherein the two time points are defined by setting a photography time interval of the first video segment.

7. The method according to claim 4, wherein based on the position information of the first position point and the second position point, determining the flight trajectory of the UAV includes:
based on the position information of the first position point and the second position point, and according to a first trajectory generation rule, generating a linear trajectory between first photography point and the second photography point; and
determining the linear trajectory as the flight trajectory.

8. The method according to claim 1, wherein the UAV makes a circular rotation in a clockwise direction, or the UAV makes a circular rotation in a counterclockwise direction.

9. The method according to claim 1, after generating the target video based on the first video segment and the second video segment, further including:
in responding to detecting a playback instruction for the target video, starting to play the target video from the second video segment; or
starting to play the target video from the first video segment.

10. The method according to claim 1, after generating the target video based on the first video segment and the second video segment, further including:
in responding to detecting a sharing operation instruction for the target video, sharing the target video.

11. The method according to claim 1, further including:
gradually expanding the obtained panoramic image in the process.

12. A video processing device, comprising:
a memory and a processor, wherein;
the memory is configured to store program instructions; and
the processor is configured to execute the program instructions stored in the memory to implement a video processing method applied to an manned aerial vehicle (UAV) equipped with a camera device for capturing videos, and the processor is configured to:
controlling the camera device of the UAV to obtain a first video segment during the UAV flying in accordance with a flight trajectory from a first photography point to a second photography point;
in response to the UAV reaching the second photography point, control the camera device of the UAV to capture environmental images to obtain a panoramic image;
generate a second video segment based on the obtained panoramic image by using a process through moving a viewing point and a projection plane of the obtained panoramic image, the second video segment including images obtained during the process, and a last video frame of the first video segment captured at the second photography point being used as a first image of the second video segment; and
generate a target video based on gradually transitioning the first video segment and the second video segment using the last video frame of the first video segment or the first image of the second video segment.

13. The device according to claim 12, wherein:
the first photography point and the second photography point are two points on the flight trajectory.

14. The device according to claim 12, wherein:
the first photography point is a first position point on the flight trajectory and selected according to a received selection operation; or
the second photography point is a second position point on the flight trajectory and selected according to a received selection operation.

15. The device according to claim 12, wherein the processor is further configured to:
acquire a first position point and a second position point;
based on position information of the first position point and the second position point, determine the flight trajectory of the UAV; and
use the first position point as the first photography point, and use the second position point as the second photography point.

16. The device according to claim 12, wherein:
the first photography point and the second photography point are two time points during the UAV moving in accordance with the flight trajectory, wherein the two time points are defined by setting a photography time interval of the first video segment.

17. The method according to claim 1, wherein in response to the UAV reaching the second photography point, controlling the camera device of the UAV to capture environmental images to obtain the panoramic image includes:
in response to the UAV reaching the second photography point, controlling a gimbal of the UAV to rotate, wherein the camera device of the UAV follows rotation of the gimbal to obtain the panoramic image.

18. The method according to claim 17, wherein controlling the camera device of the UAV to capture the environmental images to obtain the panoramic image includes.
adjusting a pitch angle of the gimbal of the UAV to a first pitch angle;
by turning a yaw angle of the gimbal, controlling the gimbal to make a circular rotation, and obtaining a first environmental image captured by the camera device during the rotation following movement of the gimbal;
after controlling the rotation for one round, adjusting, the pitch angle of the gimbal to a second pitch angle;
by turning the yaw angle of the gimbal, controlling the gimbal to make a circular rotation, and obtaining a second environmental image captured by the camera device during the rotation following movement of the gimbal; and
stitching the first environmental image with the second environmental image to obtain the panoramic image.

19. The method according to claim 18, wherein stitching the first environmental image with the second environmental image to obtain the panoramic image includes:
obtaining a first feature set of the first environmental image and a second feature set of the second environmental image;
performing, a feature matching according to the first feature set and the second feature set to obtain a matched feature set;
determining a stitching line between the first environmental image and the second environmental image according to the matched feature set; and
according to the determined stitching line, stitching the first environmental image with the second environmental image to obtain the panoramic image.

20. The method according to claim 1, wherein in response to the UAV reaching the second photography point, controlling the camera device of the UAV to capture environmental images to obtain the panoramic image includes:
  in response to the UAV reaching the second photography point, controlling the UAV to rotate, wherein the camera device of the UAV follows rotation of the UAV to obtain the panoramic image.

* * * * *